Aug. 17, 1965   O. G. LANDSVERK ETAL   3,200,654
HERMETIC SEAL CONSTRUCTION
Filed May 6, 1963
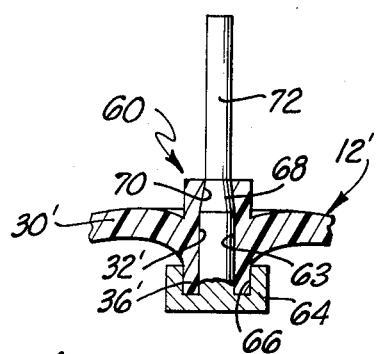
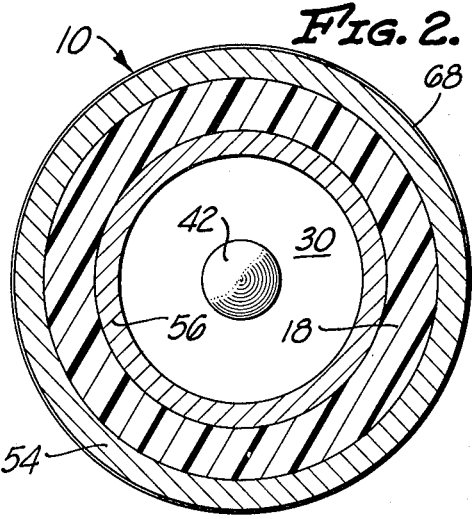
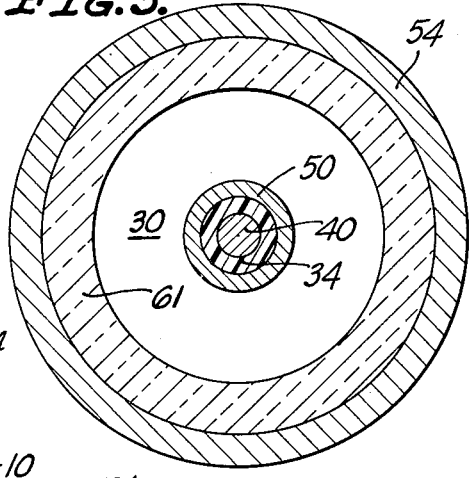
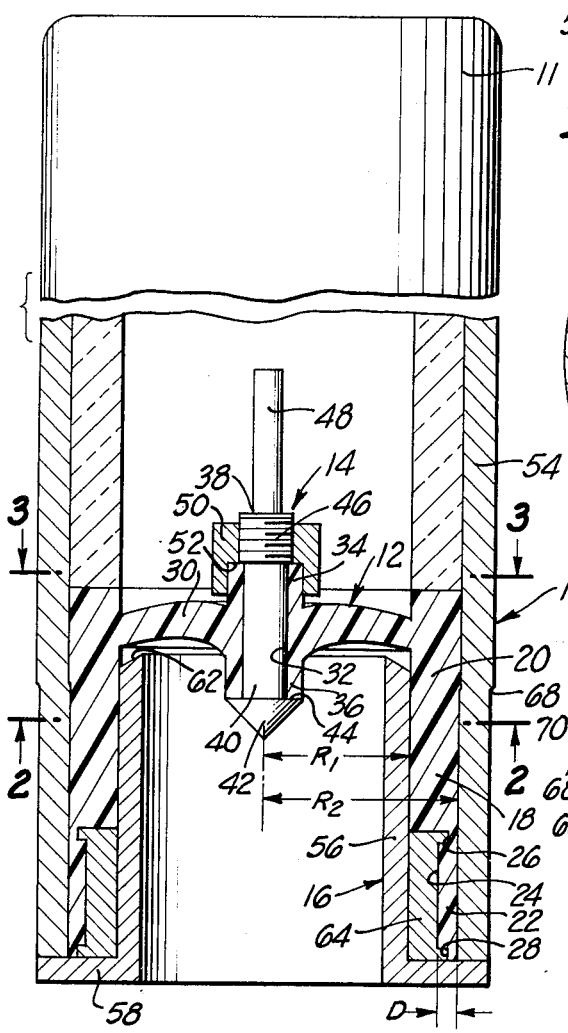
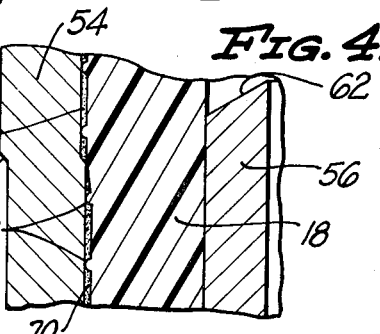
INVENTORS
OLE G. LANDSVERK,
WILLIAM R. ANDERSON
BY
EDWARD D. O'BRIAN
ATTORNEY

United States Patent Office

3,200,654
Patented Aug. 17, 1965

1

3,200,654
HERMETIC SEAL CONSTRUCTION
Ole G. Landsverk, Glendale, and William R. Anderson,
Burbank, Calif., assignors to Landsverk Electrometer
Co., Glendale, Calif., a corporation of California
Filed May 6, 1963, Ser. No. 278,309
2 Claims. (Cl. 74—18.2)

This invention generally relates to a hermetic seal construction. More specifically, this invention relates to the construction of a hermetically sealed diaphragm capable of effectively sealing an associated measuring or detecting instrument over a wide range of temperature and pressure variations.

Present day technological advancements have imposed severe demands upon precision detection and measurement instrumentation devices. Many applications of such instruments not only require precise detection and/or measurement of minute physical quantities but, also, that such detection and/or measurement be precisely effected in environments having wide ranges of temperature and pressure variations. While many prior art measuring and detecting instruments have performed satisfactorily when operated in environments of limited temperature and pressure range, their performance has been unreliable or they have failed to operate at all when these limits have been exceeded. In addition, some precision instruments are capable of functioning with a desired sensitivity in a particular temperature and pressure environment but suffer a marked loss of sensitivity when this environment is changed to any material extent.

An example of the latter type instrument is the well known dosimeter. Such instruments are utilized principally to measure exposure to radioactive radiation. In their construction, this type of instrument includes a voltmeter, usually of the quartz fiber type, mounted within an ionization chamber containing a fixed amount of a particular gas and an electrode or charging pin extending into the chamber through a flexible sealing structure. The usual cause for failure or loss of sensitivity is the failure of the sealing structure as a result of the instrument being subjected to different temperature and pressure environments. It has been found that many times such instruments operate dependably when taken from a particular temperature and pressure environment to one of substantially different range, but fail to operate satisfactorily when returned to the original environment. It appears that this type of failure is related to the thermal expansion and contraction characteristics of these sealing structures.

Accordingly, it is an object of this invention to provide a new and improved sealing structure not subject to the disadvantages enumerated above.

It is another object of the present invention to provide a hermetic sealing construction capable of maintaining an effective seal when used in environments having a wide range of temperature and pressure variation.

A further object of this invention is the provision of a hermetic sealing structure including a flexible diaphragm having an electrode extending therethrough which includes means for mounting with respect to a device with which it is utilized and to attach said electrode thereto in a manner whereby said structure maintains an effective seal when subjected to a wide range of temperature and pressure variations.

2

It is still another object of this invention to provide a hermetic sealing construction inexpensive to manufacture, efficient in operation, easily installed and removed from operating assembly, and capable of long periods of reliable use.

The manner in which the advantages of the present invention are more particularly realized and its further objects and features achieved will become more clearly apparent from the subsequent detailed description of the invention taken in reference to the accompanying drawings in which:

FIG. 1 is a cross-sectional view of a seal construction embodying the present invention;

FIG. 2 is a cross-sectional view taken along line 2—2 in FIG. 1;

FIG. 3 is a cross-sectional view taken along line 3—3 in FIG. 1;

FIG. 4 is an enlarged portion of FIG. 1; and

FIG. 5 is a partial view showing a part of a diaphragm assembly as indicated in preceding figures and a modified electrode or charging pin assembly.

The accompanying drawing is primarily intended so as to illustrate a presently preferred means of constructing a hermetic seal construction falling within the scope of this disclosure. It is to be understood that those skilled in the art to which this invention pertains may effect alterations in the embodiment disclosed by use of ordinary engineering skills without departure from the inventive concepts of the device.

Briefly described the present invention involves a hermetic seal construction including a deformable diaphragm unit formed from a suitable elastomeric material which comprises an outer tubular sleeve having a diaphragm membrane integrally joined to the inner wall of the tubular sleeve intermediate the ends of the sleeve and a centrally positioned electrode or charging pin extending in sealed relation through the diaphragm membrane. This seal construction further includes a plurality of concentrically disposed sleeve elements which serve to connect the tubular sleeve portion of the diaphragm unit in sealed relation to an instrument with which the hermetic seal construction is associated. The various materials utilized to form the different elements of this construction are selected so that changes in the dimensions of the different elements in accordance with their thermal coefficients of expansion and contraction of their particular materials function to maintain the quality of the seal between the different elements when subjected to a wide range of temperature and pressure variations.

The invention can be more fully understood by referring to the accompanying drawing in which FIG. 1 shows a longitudinal cross-sectional view of a preferred form of a hermetic seal assembly 10 constructionally associated with a dosimeter device 11. It is to be understood that the inner workings of the dosimeter 11 form no part of the present invention, but merely serve to illustrate typical forms of instruments with which the novel seal assembly can be associated.

Basically the seal assembly 10 comprises a diaphragm unit 12, electrode or charging pin assembly 14, and a mounting assembly 16 for attachment of the diaphragm unit 12 to an associated instrument, such as the dosimeter 11.

The diaphragm unit 12 comprises an elongated outer cylindrical sleeve 18 formed by a relatively thick upper portion 20 and a relatively thin lower portion 22. The lower portion 22 and upper portion 20 include a common outer wall. As can be seen most clearly in FIG. 1, the lower portion 22 of the sleeve 18 is defined on its inner periphery by an annular end recess 24 which includes smaller annular groove 26 and recess 28 at its upper and lower ends, respectively. Diaphragm unit 12 further includes a diaphragm membrane 30 integrally joined at its outer periphery to the upper portion 20 of the sleeve 18 intermediate the ends of the sleeve 18. At its central portion the membrane 30 is provided with a tubular opening 32. This opening 32 is coaxial with respect to the sleeve 18 and is provided wtih a length greater than the thickness of the membrane 30 by means of upper and lower tubular extensions 34 and 36 formed integrally with the membrane 30.

The diaphragm unit 12 is molded from an elastomeric material, such as the plastic materials polyethylene and Teflon. These materials merely represent examples from a wide range of materials having similar physical characteristics that may be employed for the construction of the diaphragm member of the seal assembly.

The electrode or charging pin assembly 14 comprises a pin 38 which includes a portion 40 of slightly greater diameter than the central opening 32 of the membrane 30 and a length substantially the same as that of the opening 32. This pin 38 is provided with a conical end 42 having a base diameter substantially equal to the outer diameter of the tubular projection 36 so as to define a bearing shoulder 44 which abuts the end of the projection 36. A threaded section 46 is provided between the intermediate portion 40 and a contact stem part 48 of the pin which cooperates with a cup-shaped nut 50. A recess 52 in the lower end of the nut 50 is diametrically dimensioned so as to have a snug fit with respect to the outer surface of the tubular projection 34 and is of a depth so that the projections are clamped in compression between the nut 50 and the shoulder 44 when the nut is applied to the threaded section 46 of the pin 38.

When assembling the pin 38 and nut 50 onto the membrane 30, the inner surface of the opening 32 and the adjacent surfaces of the pin 38 are lubricated with a low vapor pressure, high viscosity grease that will remain soft down to −80° F. Greases meeting these requirements are commonly known as silicone greases. After the parts have been greased, as described, the conical end 42 is forced through the opening from the open end of the projection 34 until the shoulder 44 emerges through the open end of the projection 36. After this has been accomplished, the nut 50 is applied to the threaded section 46 of the pin and tightened until the projections 34 and 36 are disposed under compression between the nut 50 and the shoulder 44.

The diaphragm unit 12 is attached in sealed relation to the dosimeter 11 by the mounting assembly 16 which includes as a part thereof the cylindrical sleeve 18. This mounting assembly includes an outer tubular member 54 formed by an extension of the housing of the dosimeter to which the seal assembly 10 is attached. It is to be understood that the tubular member 54 may, if desired, be a separate sleeve which can be secured as by soldering, for example, to a receiving portion of the dosimeter 11 or other type instrument with which it is desired to utilize the seal assembly 10. This mounting assembly 16 is further formed by an inner cylindrical sleeve 56 positioned within the lower end of the cylindrical sleeve 18 of the diaphragm unit so that this section of the sleeve 18 is entrapped between the sleeve 56 and the tubular member 54. The lower end of the sleeve 56 is provided with an end flange 58 that abuts against the bottom of both the tubular member 54 and the sleeve 18 so that the sleeve 18 is entrapped in endwise relation between the flange 58 and the bottom end of a spacer member 61 extending between the seal assembly 10 and the internal parts of the dosimeter 11. It is to be noted that the top end of the sleeve 56 is provided with a tapered surface 62 to preclude wearing of the diaphragm unit 12 as it normally flexes during operational movement of the seal.

The assembly 16 further includes an insert ring 64 formed from Invar alloy. This ring is secured to the eleeve 18 during molding of the diaphragm unit and has completely ribs forming the groove 26 and recess 28 as well as the annular recess 24.

As shown in enlarged section in FIG. 4, the outer surface of the sleeve 18 of the diaphragm unit is provided with a series of spaced shallow circumferential ribs or ridges 66.

In assembling the mounting unit 16, the outer surface of the tubular sleeve 18 is coated with a low vapor pressure, high viscosity grease of the same type used to lubricate the pin 38 in the manner previously described. The sleeve 18 along with the bonded ring 64 are then inserted into the end of the tubular member 54 to a point where the top end of the sleeve abuts the lower end of the spacer member 61. The sleeve 56 is then inserted into the lower end of the diaphragm sleeve 18 with the flange 58 disposed in tight abutment with the bottom of the tubular member 54, the sleeve 18 and the ring 64. After the above operations have been effected the bottom or lower end of the tubular member is forced into a complementary collet die of smaller diameter than the member 54 to shrink the tubular member 54 by swaging to the point represented by the shoulder 68. This will result in a tight compression fit between the sleeve 18 and the member 54 and the sleeve 56 with the spaces 70 between the ribs 66 of the sleeve 18 filled with the described lubricating grease.

In describing the principle of operation of the mounting unit it is assumed that the sleeve 56 and the tubular member 54 are formed from the same metal which, for example, could be aluminum. As the ambient temperature is raised to the range of say 150° F., the member 54 and sleeve 56 will expand. The space between these two elements will also expand by an amount which is determined by the following expression.

(1) $$(R_2-R_1)K_1T$$

In Equation (1) the quantity $(R_2-R_1)$ is the space between the member 54 and the sleeve 56, $K_1$ is the thermal coefficient of expansion of the metal forming member 54 and the sleeve 56, and T is the number of degrees that the temperature is raised above room temperature.

During expansion of sleeve 56 and member 54 the sleeve 18 of the diaphragm unit is also expanding in accordance with the following expression.

(2) $$(R_2-R_1)K_2T$$

In Equation (2) the quantity $(R_2-R_1)$ represents the thickness of the sleeve 18, $K_2$ is the thermal coefficient of expansion of the plastic material forming the sleeve 18, and T is the number of degrees that the temperature is raised above room temperature.

Under certain conditions the hermetic seal of the assembled mounting unit 16 will become tighter as the temperature increases. This occurs when $(R_2-R_1)K_2T$ is greater than $(R_2-R_1)K_1T$ or simply when $K_2$ is greater than $K_1$. This latter condition is easily fulfilled because the coefficient of expansion for plastics is invariable greater than the coefficient of expansion for metals.

While there is always the problem of cold flow of plastics that tend to destroy hermetic seals using such materials in temperatures ranging up to 160 F., the tendency for such cold flow is eliminated in the present seal construction by the swaging of the member 54 over a substantial length compared to the thickness of the sleeve 18. Cold flow is further minimized by the entrapment of the sleeve 18 between the flange 58 and the spacer member 61. Also, since such plastics as polyethylene have a tendency to return to their original shape when they have been deformed, the provision of the ribs 66 on the outer surface of the sleeve 18 will insure that the sealant grease will be carried properly into the joint surfaces between the member 54 and the sleeve 18. This also leaves the ribs 66 free to rise again and maintain the seal as the pressure on the flange 58 is lowered as room temperature is again approached.

When the temperature in which the seal is present goes below room temperature the hermetic seal is maintained by a different action of the mounting unit 16. The ring 64 molded into the recess 24 of the sleeve 18 is made of Invar alloy whose coefficient of thermal expansion is very nearly zero. The lower portion 22 of the sleeve 18 is molded over the outer face of this ring to a thickness D of about one quarter of the space $(R_2-R_1)$. In respect to quartz fiber dosimeters, the spacing $(R_2-R_1)$ may be about .040 inch and the part corresponding to the portion 22 may be about .010 inch in thickness.

With this arrangement, as the temperature is lowered below room temperature, the space D is reduced by an amount determined by the quantity $R_2K_1T$ and the thickness D of the portion 22 of the plastic sleeve 18 will shrink by only $DK_2T$. In order to maintain a seal when the temperature drops below room temperature it is required that $R_2K_1T$ be greater than $DK_2T$. This can be reduced to the condition that $R_2/D$ is greater than $K_2/K_1$.

This condition is readily fulfilled in the case of most plastics used in conjunction with hermetic seals for dosimeters because the ratio $R_2/D$ in conventional quartz fiber dosimeter assemblies will be in the range of .250″/.010″ or about 25. However, the ratio $K_2/K_1$ for most plastics and metals is about 10. In the present application of the hermetic seal of this invention or in other applications if it occurs that the ratio $R_2/D$ is not sufficiently greater than the ratio $K_2/K_1$ the condition can be remedied by reducing the dimension D or by choosing materials with smaller $K_2$ or larger $K_1$. It is to be noted that in regard to quartz fiber dosimeter assemblies that any appreciable change in $R_2$ is not feasible.

The hermetic seal around the metal pin or contact 38 with respect to the opening 32 in the membrane 30 is relatively simply maintained. When the temperature is lowered the plastic sleeve around the pin 38 defined by the projections 34 and 36 will shrink more tightly around the pin since the coefficient of thermal expansion $K_2$ of the material forming the membrane is larger than that of the pin 38. When the temperature is raised pressure builds up between the recess 52 in the nut 50 and the shoulder 44 for the same reason.

In FIG. 5 there is shown a modified electrode or charging pin 60 used in combination with a diaphragm unit 12′ which is substantially identified with the diaphragm 12 previously described. In the interest of brevity various parts of the diaphragm unit 12′ are not separately identified herein and are designated both in the remainder of this specification and in the drawings by the primes of the numerals previously used to designate such parts.

The pin 60 has an intermediate portion 63 of slightly greater diameter than the central opening 32′ of the membrane 30′ and a length which is substantially the same as that of the opening 32′. This pin 60 is provided with a cap-shaped end 64 which provides a groove 66 containing a portion of the tubular projection 36′. This groove 66 is dimensioned so as to have a snug fit with respect to the outer surface of the projection 36′. A tapered shoulder 68 on the pin 60 fits in the same manner within a tapered constriction 70 in the tubular opening 32′; a contact stem part 72 extends from the shoulder 68 in the same manner in which the part 48 extends from the assembly 14 previously described.

The pin 60 is assembled with respect to the diaphragm unit 12′ by being first coated with a grease such as is employed in the installation of pin assembly 14 with respect to the diaphragm unit 12′. After being so coated the pin 60 is merely forced into position with respect to the diaphragm unit 12′. A seal is maintained with this structure for substantially the reasons outlined in the preceding with respect to the maintenance of a seal around the pin 38.

From the foregoing it is apparent that the present invention provides a hermetic seal assembly having a construction of elements of particular materials whereby the seal will be maintained by thermal expansions and contractions of the materials of the construction as the assembly is subjected to temperatures above or below normal room temperatures and wherein the hermetic seal is maintained over a wide pressure range.

It will be realized by those skilled in the art to which the invention pertains that by ordinary skills a variety of differently appearing hermetic seal assemblies may be designed and built utilizing the features of the invention as embodied in the above described example of the device of the invention. Accordingly, since the structures of this invention are susceptible to such modification the invention is to be considered as being limited only by the appended claims.

We claim:
1. A hermetic seal structure which comprises:
   a tubular housing having an open end and an interior surface defining an interior diameter;
   a diaphragm formed from elastomeric material, said diaphragm comprising a tubular sleeve having interior walls which define an inner surface and an interior diameter, a membrane extending between the inner walls of said tubular sleeve intermediate the ends of said tubular sleeve, said tubular sleeve having the exterior thereof in contact with said interior surface of said tubular housing, said tubular sleeve having first and second ends, said tubular sleeve being recessed on its inner surface, a ring positioned within said recess, said ring having a substantially zero coefficient of thermal expansion, the distance from the bottom of the recess to the exterior surface of said tubular sleeve defining a first distance and the ratio of the radius of the exterior of said tubular sleeve to said distance forming a first ratio;
   said tubular housing having a shoulder positioned therein, said first end of said tubular sleeve being in contact with said shoulder within said tubular housing, said tubular housing being made of a material having a first coefficient of thermal expansion and said tubular sleeve being made of a material having a second coefficient of thermal expansion, the ratio of said second coefficient of thermal expansion to said first coefficient of thermal expansion forming a second ratio, said first distance being such that said ratio is greater than said second ratio;
   a clamping sleeve disposed within said tubular sleeve so that the exterior of said clamping sleeve is in contact with the interior of said tubular sleeve to clamp said tubular sleeve between said housing and said clamping sleeve, said clamping sleeve having an end flange extending laterally outward from said clamping sleeve, said end flange being in contact with said second end of said tubular sleeve and in contact with said housing so that said tubular sleeve is constrained at its first and second ends and at its interior and exterior surfaces.

2. A hermetic seal structure which comprises:
   a tubular housing having an open end and a cylindrical interior surface having a first radius;
   a diaphragm formed of elastomeric material, said diaphragm comprising a peripheral tubular sleeve, said ring being formed of a material having a substantially zero coefficient of thermal expansion having ends and having inner walls, and a membrane extending between said inner walls of said tubular sleeve intermediate the ends of said tubular sleeve, said tubular sleeve having an exterior surface in contact with said cylindrical interior surface of said tubular housing, said tubular sleeve having an interior surface at a first distance from the exterior surface thereof;

a ring positioned against said interior surface of said tubular sleeve;

said tubular housing being made of a material having a first coefficient of thermal expansion and said tubular sleeve being made of a material having a second coefficient of thermal expansion, said second coefficient of thermal expansion forming a first ratio with respect to said first coefficient of thermal expansion, said first radius forming a second ratio with respect to said first distance, said first distance being arranged so that said first ratio is greater than said second ratio so that sealing is maintained between said tubular sleeve and said tubular housing upon decrease in ambient temperature.

References Cited by the Examiner

UNITED STATES PATENTS 2,976,420  3/61  Landsverk et al.
3,017,511  1/62  Landsverk et al.

BROUGHTON G. DURHAM, *Primary Examiner.*

MILTON KAUFMAN, *Examiner.*

UNITED STATES PATENT OFFICE
CERTIFICATE OF CORRECTION

Patent No. 3,200,654                        August 17, 1965

Ole G. Landsverk et al.

It is hereby certified that error appears in the above numbered patent requiring correction and that the said Letters Patent should read as corrected below.

Column 4, line 8, for "eleeve" read -- sleeve --; line 9, for "completely" read -- complimentary --; line 64, for "invariable" read -- invariably --; line 68, for "160 F." read -- 160° F. --; column 5, line 44, for "themal" read -- thermal --; column 6, lines 66 to 68, strike out "said ring being formed of a material having a substantially zero coefficient of thermal expansion" and insert the same after "sleeve", in column 7, line 2.

Signed and sealed this 19th day of April 1966.

(SEAL)
Attest:

ERNEST W. SWIDER                        EDWARD J. BRENNER
Attesting Officer                          Commissioner of Patents